United States Patent [19]

Wittler et al.

[11] Patent Number: 4,545,717
[45] Date of Patent: Oct. 8, 1985

[54] MACHINE FOR CHARGING A GLASS MELTING TANK FURNACE

[75] Inventors: Fritz Wittler, Hürtgenwald-Gey; Michael Fraikin, Heimbach, both of Fed. Rep. of Germany

[73] Assignee: Zimmermann & Jansen GmbH, Düren/Rhld., Fed. Rep. of Germany

[21] Appl. No.: 397,584

[22] Filed: Jul. 12, 1982

[30] Foreign Application Priority Data

Feb. 20, 1982 [DE] Fed. Rep. of Germany ....... 3206174

[51] Int. Cl.$^4$ .............................................. C03B 3/00
[52] U.S. Cl. .................................... 414/166; 414/187; 414/198; 65/335; 222/342
[58] Field of Search ............... 414/165, 166, 187, 198; 65/335; 222/342

[56] References Cited

U.S. PATENT DOCUMENTS

| | | | |
|---|---|---|---|
| 2,281,050 | 4/1942 | Redshaw | 414/166 |
| 3,667,627 | 6/1972 | Martin et al. | 414/198 |
| 3,780,889 | 12/1973 | Frazier et al. | 65/335 X |
| 4,226,564 | 10/1980 | Takahashi et al. | 65/335 X |

FOREIGN PATENT DOCUMENTS 3016635 11/1981 Fed. Rep. of Germany ........ 65/335

Primary Examiner—Robert J. Spar
Assistant Examiner—Ken Muncy
Attorney, Agent, or Firm—Collard, Roe & Galgano

[57] ABSTRACT

A charging machine for charging a glass melting tank furnace includes a reciprocatable charging table above which a hopper is provided for the batch, at the rear side of which at least one movable scraper is provided which seals the slot between the rear wall of the batch hopper and the top surface of the loading table. In order to eliminate the wear on the lower edge of the movable scraper and the surface of the charging table which comes into engagement with the movable scraper, the movable scraper is connected to stroke elements for lifting and lowering, whose stroke is controlled in dependency on the movements of the loading table in such a manner that the movable scraper is lifted during the forward movement of the charging table and is lowered during the return movement of the charging table. In this charging machine, wear occurs only during the table return movement, but not during the table forward movement, so that the wear is cut in half, thus doubling the service life of the machine.

10 Claims, 6 Drawing Figures

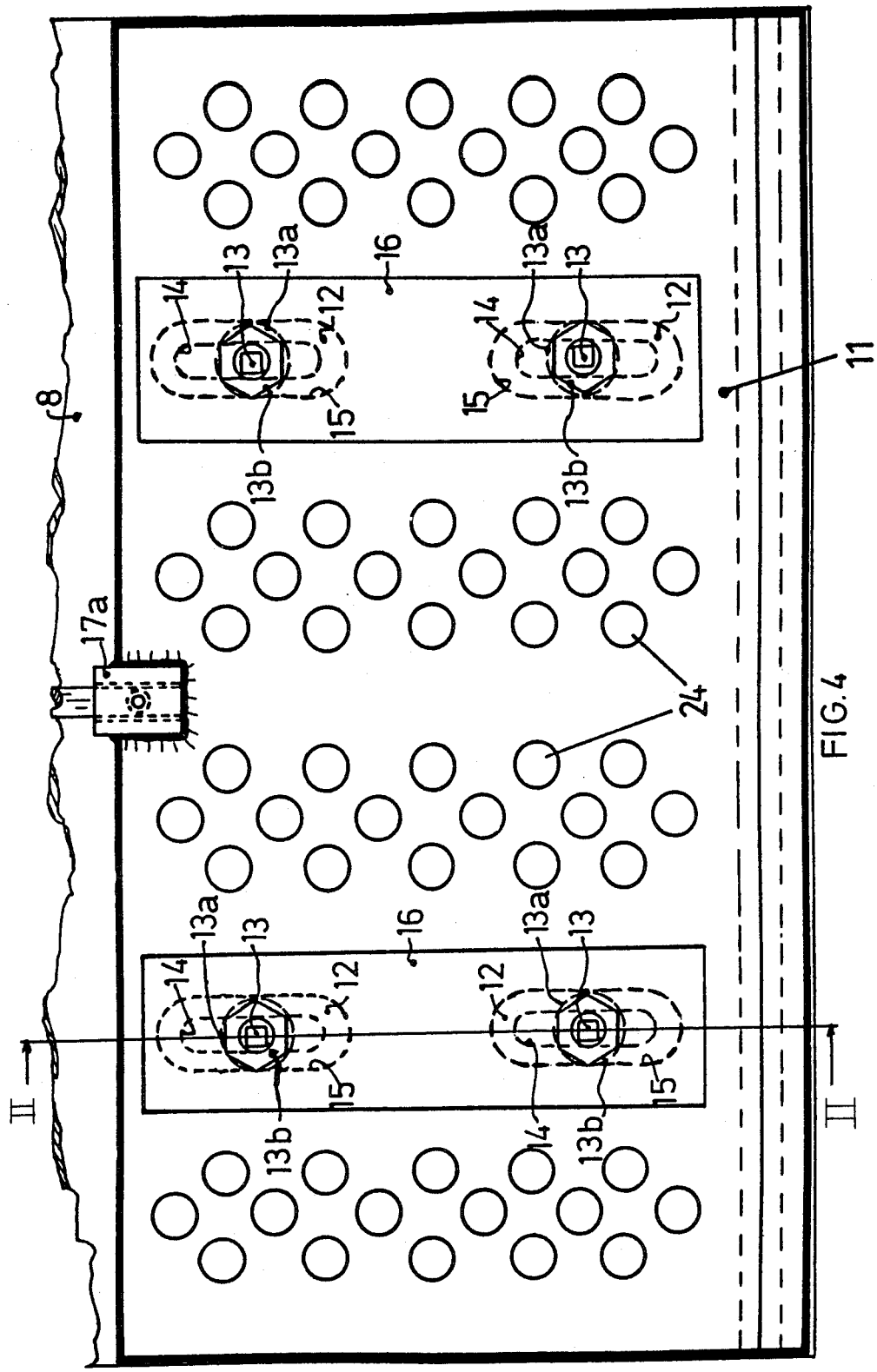

MACHINE FOR CHARGING A GLASS MELTING TANK FURNACE

The invention relates to a charging machine for charging a glass melting tank furnace having a reciprocating charging table or plate above which a container or hopper for the batch is provided, on the front side of which an opening slot is provided which is adjustable and limited from beneath by the charging table and at the rear side of which at least one movable scraper or plate is provided which seals the slot between the rear wall of the batch hopper and the top surface of the charging table.

In a known charging machine of the above-mentioned type, (see, e.g., the glass batch feeder disclosed in U.S. Pat. No. 3,780,889) the movable scraper or plate referred to as a "sand seal" is pivotably-mounted on a pivot bolt behind the rear wall of the hopper in such a manner that the scraper edge is held in constant contact with the top surface of the charging table, due to its own weight. In this embodiment of the movable sand seal, the batch is undesirably pressed in a pump-like manner into the space between the rear wall of the hopper and the sand seal by the return stroke movement of the charging table and hardens in this intermediary space, so that the pivot mounting is blocked. On the one hand, this results in extreme stress on the drive of the charging table and, on the other hand, in extreme wear, especially on the top surface of the table. The required sealing between the sand seal and table surface is no longer accomplished; this results in a heavy discharge of the batch between the lower edge of the sand seal and the table top surface and, therefore, to an undesirable batch accumulation on the charging table behind the hopper.

These disadvantages are at least partially eliminated in a charging machine wherein one or a plurality of scrapers are disposed in a row and are guided in guides disposed parallel relative to the rear wall and are pressed against the charging table by their own weight, and, optionally, by additional loading via a balance or weighted levers, (see, for example, German Offenlegungsschrift No. 30 16 635). But in this case, the scraper edges and the area of the charging table which comes into contact with the scraper edge is subjected to a heavy wear because sharp-edged hard particles from the batch, for example, quartz crystals, get into the sealing slot between the scraper edge and the top surface of the charging table and wear out the metal in a grinding manner. Such a stress results in heavy wear even with highly wear-resistant materials, so that it becomes necessary to replace the worn-out parts from time to time. However, this is very difficult in a charging machine because the productivity of glass melting tank furnace whose continuous service life lasts over a plurality of years would be considerably impaired.

These disadvantageous wear appearances are also apparent in scraper bars which are directly screwed to the rear wall of the hopper and which are in constant contact with the replaceable wear plates of the charging table or platform. Therefore, it would be ideal if the charging table or the exchangeable wear plates on the charging table, as well as the scraper itself would last longer as compared to the operating life of the furnace. However, this is not feasible in accordance with the state of the art, even with the best wear-resistant materials.

It is therefore an object of the invention to further improve the charging machine of the aforementioned type in that the service life of the scraper and the charging table are considerably prolonged.

This is achieved according to the present invention by the provision of a charging machine of the aforementioned type, wherein the movable scraper or scrapers are connected with stroke elements for lifting and lowering, whose stroke is controlled in dependency on the movements of the charging table in such a manner that the scraper is lifted during the forward movement of the charging table and is lowered during the return movement of the charging table.

In the charging machine according to the invention, the movable scraper is in sealing engagement with the table surface only during the return movement of the charging table. During the forward movement of the table, during which no batch material can get into the slot to be sealed, because of the movement direction, the scraper is lifted, so that no wear occurs on the charging table, or on the wear plates mounted thereon, or on the scraper edge of the scraper. Therefore, the wear is cut in half in accordance with the inventive measures, thus doubling the service life of the device. When highly wear-resistant materials are used for the scraper and the charging table, one can obtain service lives which correspond to the operating life of the furnace.

In order to prevent the guides of the movable scraper from becoming blocked with batch components which would hinder the movement of the movable scraper, the movable scraper preferably has widened longitudinal openings above its scraper edge into which guide bolts engage which are bolted to the rear wall of the batch hopper, and which serve to guide the scraper in conjunction with the longitudinal openings.

For a further protection of the movable scraper, an adjustable and lockable prescraper is advantageously mounted between the movable scraper and the rear wall of the batch hopper in the displacement direction of the scraper. This prescraper is disposed at such a height that it does not come into contact with the charging table. This prescraper, whose height position is adjustable above the charging table, provides that the movable scraper must only retain as many batch components as are absolutely necessary. Thus, the movable scraper is saved from additional wear.

In order to prevent fine batch particles from traveling upwardly on the scraper and settling in the intermediary space between the scraper and the prescraper or its support elements, it is further desirably provided that the movable scraper and/or its support elements are provided with a plurality of continuous bores between the longitudinal openings. With these bores, fine batch components are scraped off in the aforementioned intermediary spaces and can discharge through the rear.

Alternatively, the movable scraper or the prescraper may be covered over their total surface with a stationary slide cover, in particular made of hard felt or the like, filling the intermediary space therebetween so that no batch components can penetrate therebetween.

Advantageously, the protruding prescraper is also provided with vertically-widened longitudinal openings through which the guide bolts of the movable scraper extend. These guide bolts are bolted to the rear wall of the batch hopper, and are each provided with one shoulder or a collar with which the prescraper is pressed against the rear wall of the batch hopper. In this manner, the required guide bolts for guiding the movable scraper have a double function; on the one hand, as locking and guiding elements for the prescraper, and, on the other hand, as guiding elements for the movable scraper.

So as to be able to adjust the movable scraper during a changed table inclination or during wear on the scraper edge of the table surface, it is further provided that the height position of the stroke element and/or connection between the stroke element and the movable scraper or between the stroke element and its upper mounting is adjustable in the displacement direction of the scraper. If need be, the stroke path of the scraper or the stroke element can be reduced.

The control of the stroke elements is carried out advantageously by one or a plurality of control elements associated with the drive of the charging table, which scan the forward movements and return movements of the charging table and which correspondingly control the stroke elements.

In order to be able to exchange a worn-out scraper edge, if need be, it is further advantageously provided at its lower side with an exchangeable scraping bar.

This exchangeable scraping bar may be additionally provided with a sealing bar made of a wear-resistant material which is stamped into a groove of the exchangeable scraper bar. Thereby, if need be, the exchanged scraping bar may be provided with a new sealing bar.

Other objects and features of the present invention will become apparent from the detailed description considered in connection with the accompanying drawings, which disclose several embodiments of the invention. It is to be understood that the drawings are to be used for the purposes of illustration only, and not as a definition of the limits of the invention.

In the drawings, wherein similar reference characters denote similar elements throughout several views:

FIG. 2a is a sectional view of an exchangeable scraper bar for the movable scraper;

FIG. 2b is a sectional view of an alternate embodiment of the exchangeable scraper bar with a stamped-in sealing bar for the movable scraper;

FIG. 4 is a front view of the movable scraper similar to FIG. 3 showing its attachment to the batch charging machine.

Figure 1:
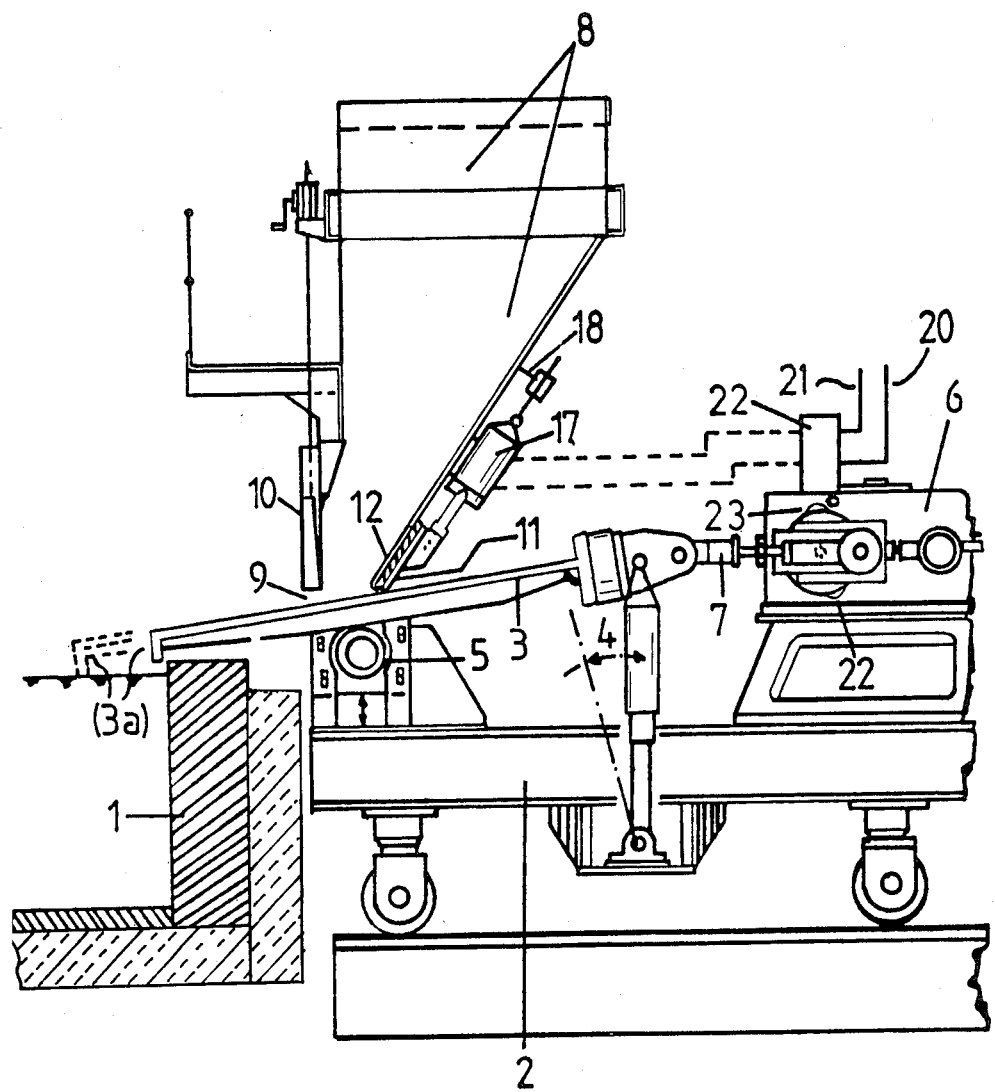
FIG. 1 is a cross section through a furnace filling pocket and a batch charging machine embodying the present invention.

Referring now in detail to the drawings, and in particular FIG. 1 thereof, there is shown the filling pocket or doghouse of a glass melting tank, designated by reference numeral 1. The charging machine or batch feeder in accordance with the invention is mounted in a known manner on a movable frame 2 disposed on the outside of and in front of, the furnace filling pocket 1.

The charging machine is provided with a charging table or platform 3 which is movable forward and backward between two positions and which is adjustable in its stroke path. The table 3 is mounted on the frame 2 by means of longitudinally-adjustable link supports 4 and one or a plurality of height adjustment support rollers 5. The table incline which extends into the direction of the glass melt tank 1 can be adjusted in a given manner by means of the longitudinally-adjustable link supports 4.

The reciprocating drive of the charging table 3 is carried out by an eccentric drive 6 which is also mounted on frame 2, whose adjustable stroke is transmitted to the charging table 3 by means of connecting rods 7. At the side facing the charging back wall 1, the charging table 3 is provided with a downwardly-projecting, heat-resistant table projection or lip 3a with which the batch is pushed into the glass melt in the melting tank furnace during the forward movement of the charging table.

A batch container or hopper 8 is provided above the charging table and is connected with the frame 2. The hopper is continuously filled with a batch by means of a feeding device mounted thereabove extending over the total width of the charging table 3 (not shown). The batch hopper 8 is closed below by the charging table 3. An opening slot 9 remains on the front side of the hopper 8 opposite the charging table 3, whereby the height of this slot is adjustable by means of one or a plurality of adjacent slides 10.

A movable scraper or seal plate 11 is mounted on the rear side of the hopper 8 which seals the slot between the rear wall of the hopper 8 and the charging table 3. A pre-scraper 12 which is adjustable and lockable in the displacement direction of the scraper 11 is provided between the movable scraper 11 and the rear wall of the hopper 8.

Figure 2:
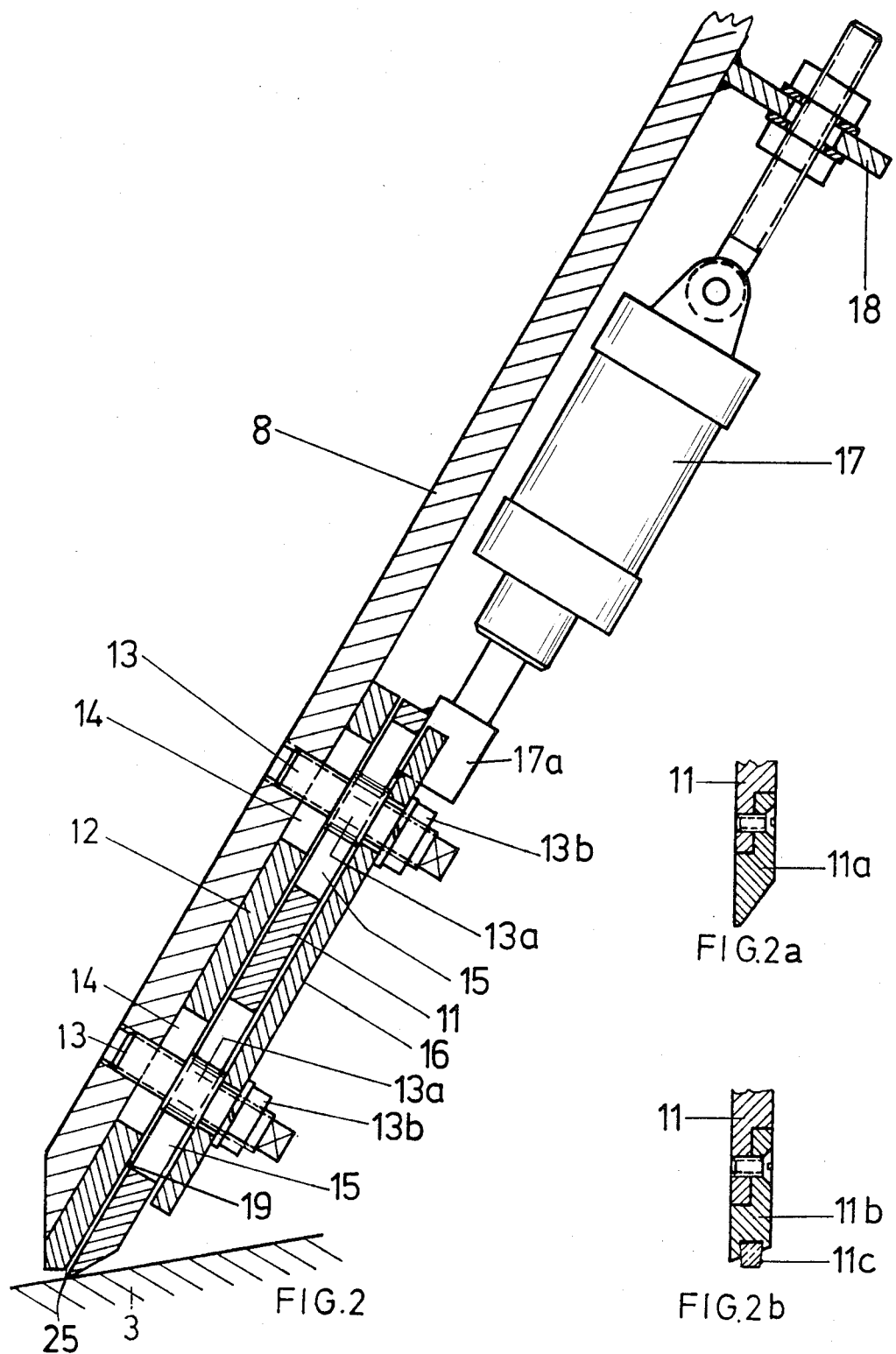
FIG. 2 is an enlarged, fragmentarily-illustrated vertical sectional view through the rear wall of the batch hopper, further showing the scrapers mounted thereon.

The mounting and guiding of the movable scraper 11, as well as prescraper 12, on the rear wall of the hopper 8 can be seen in detail in FIGS. 2 and 4. Guide bolts 13 are screwed into the rear wall of hopper 8 and protrude through longitudinally-extending elongated openings 14 in the prescraper 12 which are widened in a vertical direction. The guide bolts 13 are each provided with one shoulder or collar 13a whose diameter is larger than the width of the associated opening 14 in such a manner that the prescraper 12 can be pressed against the rear wall of the hopper 8 with the assistance of the guide bolts 13 and is lockable in different height positions relative thereto. The movable scraper 11 is also provided with lingitudinally-extending guide slots 15 widened in a vertical direction whose width is larger than the diameter of shoulders 13a of guide bolts 13, so that the movable scraper 11 with its elongated slots 15 is slidably mounted in an upward and downward direction on the guide bolts 13 in the area of its shoulders 13a. At its other side, one or a plurality of support bars or support discs 16 engage shoulders 13a of guide bolts 13 and are pressed against shoulders 13a by means of threaded nuts 13b which are screwed onto the outermost ends of guide bolts 13.

The width of the shoulder or the collar 13a defines the required freedom of movement between the prescraper 12 and the support element 16 for movable scraper 11. By adding spacing discs which are of the same diameter as shoulder 13a, one can enlarge the freedom of movement at random, so that the required easy operation of the movable scraper is assured.

As can be seen from FIGS. 2a and 2b, the movable scraper 11 may be provided with an exchangeable scraper bar 11a or 11b, if need be. In addition, the scraper bar 11b is provided with a sealing bar 11c made of a wear-resistant material which is stamped into a groove of the scraper bar 11b. The exchangeable scraper bars 11a or 11b may be designed as spring steel lamellae, or the like, if need be.

Figure 3:
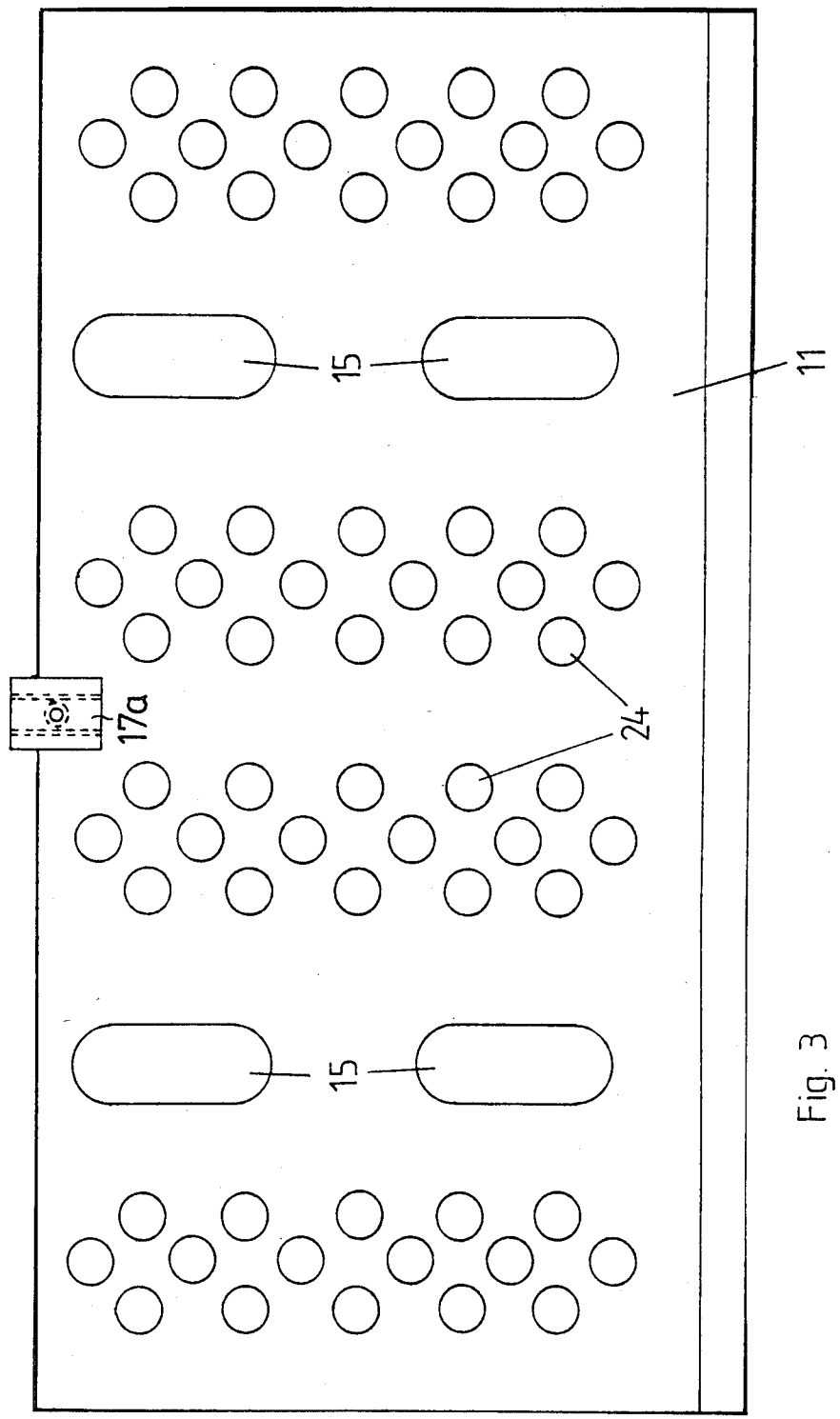
FIG. 3 is a front view of the movable scraper.

In accordance with FIG. 3, the face of the movable scraper 11 can be additionally provided with continuous bores or cleaning bores 24 in the area between the guide slots 15 which are disposed in parallel vertical rows relative to each other, through which minor amounts of fine batch particles are scraped off in the intermediary space 19 and discharge toward the rear. Such discharge bores may also be provided in the support element 16.

As clearly seen in FIG. 4, support elements 16 lie along openings 15 in scraper 11 and are engaged between the threaded nut 13b and collar 13a to thus be secured against movement with respect to bolts 13. As noted above, collar 13a is larger than the elongated slot 14 and the corresponding bolt openings in support elements 16 and smaller than the elongated opening 15 in movable scraper 11. Support elements 16 are provided only in the vicinity of openings 15 in movable scraper 11 so that the cleaning bores 24 in movable scraper 11 are open so as to eliminate the fine particles scraped off in the intermediary space 19.

By means of a rigidly adhering slide cover, designated 25 in FIG. 2, (for example, made of hard felt, or the like) on the movable scraper 11 or on the prescraper 12, the intermediary space 19 can be filled over the total face while leaving the longitudinally-extending, elongated openings free, so that the penetration of fine batch dust can be substantially prevented.

Depending on the width of the charging table 3 or the hopper 8, a plurality of closely adjacent postioned prescrapers 12 are provided, whose lateral vertical separating edges are again covered in an overlapping manner by equally long separated scrapers 12. Thereby, the discharge of batch material from the vertical separating joints is additionally and substantially prevented.

For lifting and lowering the movable scraper 11 in dependency on the movement of the charging table 3, the movable scraper 11 is connected by means of rod 17a with a stroke element 17, for example, in the form of a pressure medium cylinder or a similar device. This stroke element 17 is mounted in a height adjustable manner on a bracket 18 at the rear wall of the hopper 8. In addition to the height adjustment of the movable scraper 11, the connection between the stroke element 17 and the scraper 11 can be longitudinally displaceable, for example, by means of a turnbuckle or a threaded bolt.

The stroke elements 17 are so controlled that the movable scraper 11 is pressed against the charging table only during the return movement of the charging table 3. During the forward movement of the charging table 3, the movable scraper 11 is lifted from the charging table by means of the stroke element 17. This control is carried out in that, for example, in the pressure medium supply and discharge lines 20, 21, of the pressure medium cylinder 17, one or two control valves 22 are incorporated which are controlled by trip cams 23 of the eccentric drive 6. Due to this measure, the wear on the scraper edge of the movable scraper 11 is reduced, as well as the wear on the charging table 3 which comes into engagement therewith.

The contact pressure of the scraper 11 on the loading table 3 can be adjusted by a pressure reducing valve which is mutually disposed in the main pressure medium supply line or coupled in series directly in front of the given pressure medium cylinder, so as to meet the given requirements.

While only several embodiments of the present invention have been shown and described, it is obvious that many changes and modifications may be made thereunto without departing from the spirit and scope of the invention.

What is claimed is:

1. A machine for charging a glass melting tank furnace, comprising:

a hopper including a delivery chute having a rear wall;

a charging table having a reciprocating forward and return movement and an upper surface disposed beneath said hopper delivery chute defining a slot therebetween;

at least one movable scraper adapted for movement between an inoperative and operative position, in the latter of which it serves to seal the slot between said rear wall of said hopper and the upper surface of said charging table, said scraper having longitudinal slots widened in the direction of movement of said scraper engageable with guide bolts extending from the rear wall of said hopper for guiding said scraper during the movement thereof;

means for moving said scraper comprising at least one pressure medium cylinder secured to the rear wall of said hopper for effecting lifting and lowering of said scraper, the admittance of pressure medium into said pressure medium cylinder being controlled in dependency on the movements of said charging table in such a manner that said scraper is lifted during the forward movement of said charging table and is lowered during the return movement of said charging table; and an adjustable and lockable prescraper mounted between said movable scraper and said rear wall of said hopper having longitudinally extending openings therein for receiving said guide bolts extending from the rear wall of said hopper, said guide bolts each including a spacer engaging against said prescraper to press the same against the rear wall of said hopper.

2. The machine of claim 1, wherein said movable scraper is provided with a plurality of bores extending therethrough in the area between said longitudinally-extending openings for removal of any material from between said movable scraper and said prescraper.

3. The machine of claim 1, wherein said movable scraper has support elements provided with a plurality of bores extending therethrough in the area between said longitudinally-extending openings for removal of any material from between said movable scraper and said prescraper.

4. The machine of claim 1, wherein at least one of said movable scraper and said prescraper is covered over its total surface with a stationary slide cover, so as to fill the intermediary space therebetween.

5. The machine of claim 1, wherein said slide cover is made of hard felt.

6. The machine of claim 1, wherein the position of said pressure medium cylinder with respect to the rear wall of said hopper is adjustable in the movement direction of said scraper.

7. The machine of claim 6, wherein said pressure medium cylinder is coupled to an upper mounting bracket on said rear wall of said hopper in an adjustable manner.

8. The machine of claim 1, additionally including drive means for reciprocating said charging table and at least one control element which scans the forward and return movements of said charging table and, in a corresponding manner, controls the admittance of pressure medium into said pressure medium cylinder.

9. The machine of claim 1, wherein said movable scraper is provided at its lower side with an exchangeable scraping bar.

10. The machine of claim 9, wherein said exchangeable scraper bar has a groove and a sealing bar made of wear-resistant material which is stamped into said groove.

* * * * *